United States Patent
Wacey et al.

(10) Patent No.: US 12,380,700 B2
(45) Date of Patent: Aug. 5, 2025

(54) SURVEILLANCE SYSTEM

(71) Applicant: EtherSec Industries Ltd, London (GB)

(72) Inventors: Adam Wacey, London (GB); James Bowley, London (GB)

(73) Assignee: EtherSec Industries Ltd, London (GB)

( * ) Notice: Subject to any disclaimer, the term of this patent is extended or adjusted under 35 U.S.C. 154(b) by 15 days.

(21) Appl. No.: 18/273,763

(22) PCT Filed: Jan. 24, 2022

(86) PCT No.: PCT/EP2022/051449
§ 371 (c)(1),
(2) Date: Jul. 22, 2023

(87) PCT Pub. No.: WO2022/161900
PCT Pub. Date: Aug. 4, 2022

(65) Prior Publication Data
US 2024/0303992 A1 Sep. 12, 2024

(30) Foreign Application Priority Data

Jan. 26, 2021 (GB) ...................... 2101018

(51) Int. Cl.
*G06V 20/52* (2022.01)
*G06V 20/40* (2022.01)
(Continued)

(52) U.S. Cl.
CPC .............. *G06V 20/52* (2022.01); *G06V 20/40* (2022.01); *H04N 7/181* (2013.01); *H04N 23/73* (2023.01); *H04W 12/06* (2013.01)

(58) Field of Classification Search
CPC ........ G06V 20/52; G06V 20/40; H04N 23/73; H04N 7/181; H04W 12/06
See application file for complete search history.

(56) References Cited

U.S. PATENT DOCUMENTS

| | | | |
|---|---|---|---|
| 6,744,470 B1 * | 6/2004 | Kalshoven, Jr. | H04N 23/74 348/E5.037 |
| 10,250,948 B1 | 4/2019 | Bortz et al. | |

(Continued)

FOREIGN PATENT DOCUMENTS

| | | |
|---|---|---|
| CN | 111933297 A | 11/2020 |
| WO | 2011154949 A2 | 12/2011 |

(Continued)

OTHER PUBLICATIONS

Fraenkel, Aviezri S., and Shmuel T. Kleinb. "Robust universal complete codes for transmission and compression." Discrete Applied Mathematics 64, No. 1 (1996): 31-55.

(Continued)

*Primary Examiner* — Girumsew Wendmagegn
(74) *Attorney, Agent, or Firm* — Smartpat PLC

(57) ABSTRACT

A video surveillance system is disclosed. The system includes: at least one camera to observe a surveillance field and provide resulting video data; at least one beacon comprising at least one light emitting element and a controller providing an actuation sequence to the light emitting element such that it emits a binary signal comprising sequential on/off flashes; and a video analytics system comprising a processor configured to receive video data captured by the, at least one camera and analyse the video for the presence of light emissions from a beacon. The binary signal may consist of a plurality of transmission packets, each repeating an encoded set of data. Each transmission packet may comprise a plurality of functional sub packets, for example, a first sub-packet comprising a fixed code and a second sub-packet which changes between transmission packets. The video analytics system processor is configured to identify the sequence corresponding to the first sub-packet to determine a beacon identification and verify the authenticity (Continued)

of the beacon using the second sub-packet. A method of video surveillance monitoring is also disclosed.

15 Claims, 7 Drawing Sheets

(51) Int. Cl.
    *H04N 7/18*     (2006.01)
    *H04N 23/73*     (2023.01)
    *H04W 12/06*     (2021.01)

(56) References Cited

U.S. PATENT DOCUMENTS

| | | |
|---|---|---|
| 2002/0126005 A1 | 9/2002 | Hardman et al. |
| 2007/0205791 A1 | 9/2007 | Ahmad et al. |
| 2011/0128384 A1 | 6/2011 | Tiscareno et al. |
| 2011/0247863 A1 | 10/2011 | Watanabe |
| 2014/0267773 A1* | 9/2014 | Jeung .................. F21V 9/08 362/555 |
| 2016/0050750 A1 | 2/2016 | Rogers et al. |
| 2018/0146545 A1 | 5/2018 | Wang et al. |
| 2018/0357380 A1 | 12/2018 | Wang et al. |
| 2019/0215063 A1* | 7/2019 | Darabi .................. H04B 10/116 |
| 2020/0068351 A1* | 2/2020 | Galvez .................. H04W 4/33 |
| 2020/0176125 A1 | 6/2020 | Chatterjea et al. |
| 2021/0112657 A1 | 4/2021 | Edmundson et al. |
| 2021/0318191 A1 | 10/2021 | Okulov |
| 2023/0136688 A1 | 5/2023 | Leerentveld |

FOREIGN PATENT DOCUMENTS

| | | |
|---|---|---|
| WO | 2016128967 A1 | 8/2016 |
| WO | 2019038271 A1 | 2/2019 |

OTHER PUBLICATIONS

Adam Wacey, "Monitoring System," co-pending U.S. Appl. No. 18/273,764, national phase entry of PCT/EP2022/051457.

Nguyen, Cong T., Yuris Mulya Saputra, Nguyen Van Huynh, Ngoc-Tan Nguyen, Tran Viet Khoa, Bui Minh Tuan, Diep N. Nguyen et al. "A comprehensive survey of enabling and emerging technologies for social distancing—Part I: Fundamentals and enabling technologies." Ieee Access 8 (2020): 153479-153507.

* cited by examiner

SURVEILLANCE SYSTEM

FIELD OF INVENTION

The invention relates to a system and method of video surveillance monitoring.

BACKGROUND

Video surveillance monitoring is often used to track the movement of people or objects, through specific areas, for reasons of safety and/or security (both of which are intended to be included by the term "video surveillance monitoring", used for convenience herein). For example, video surveillance monitoring may be used in: warehousing and storage facilities; retail; residential, medical, or elderly care; industrial and construction sites or agricultural premises.

Whilst some video surveillance monitoring may be carried out by operators manually viewing live video streams, the prodigious volume of data generated by a proliferating number of installed cameras, in concert with the affordability of computer resources, mean there is an increasing demand for automated monitoring. For example, the applicants' "A-Eye" platform is designed to use artificial intelligence techniques to identify human subjects present in a video stream in real-time. In real-world environments (which are not "sterile") it can be difficult for even the most advanced systems to perform reliably and consistently. As such, video systems may also be combined with other technologies such as RFID identification devices or access control systems to provide additional data to augment the data from the video systems. Such RFID systems may have further disadvantages, for example, significant additional cost and inherent reliability issues when using radio-frequency based technology.

The applicant has proposed an improved system in their co-pending patent application GB1916245.2 (filed 8 Nov. 2019) which provides a video surveillance system with identifiable, light emitting. beacons. In particular the system of GB1916245.2 introduces a secure verification of the beacon identity without the need for any additional systems. Whilst the system and methods proposed in GB1916245.2 provide significant advantages; the applicant has now identified further improvements.

At least some embodiments of the present invention may, for example, provide systems and/or apparatus which provide improved reliability in a complex naturalistic environment. These embodiments are intended to operate in environments which implicitly introduce noise into the signal, as perceived by the video analytics system and the improvements presented mitigate against this noise becoming problematic. Further, at least some embodiments of the present invention may, for example, provide video surveillance systems and methods which enable secure identification without undue computational burden. This is particularly advantageous since the most expensive component of the entire system may be the video analytics computer and reducing the computational burden on this system allows a video analytics system to process more cameras simultaneously and/or for the system to be comprised of more economic components.

SUMMARY OF INVENTION

According to a first aspect of the invention, there is provided a video surveillance system comprising: at least one camera to observe a surveillance field and provide resulting video data; at least one beacon comprising at least one light emitting element and a controller providing an actuation sequence to the light emitting element such that it emits a binary signal comprising sequential on/off flashes; and a video analytics system comprising a processor configured to receive video data captured by the, at least one camera and analyse the video for the presence of light emissions from a beacon. The binary signal may consist of a plurality of transmission packets, each repeating an encoded set of data. Each transmission packet may comprise a plurality of functional sub packets, for example, a first sub-packet comprising a fixed code and a second sub-packet which changes between transmission packets. The video analytics system processor is configured to identify the sequence corresponding to the first sub-packet to determine a beacon identification and verify the authenticity of the beacon using the second sub-packet.

It may be appreciated that identifying a repeating signal within a stream of video data may be a relatively simple computational task. This contrasts with possible difficulties relating to identifying a changing system where it may be necessary to use a time-windowing approach to match an observed signal with a window of alternative time-frames (for example, to allow for irregularities introduced by network or decoding issues). Such an approach may become particularly computationally demanding when applied to a real-word environment (with variable environmental conditions and background clutter may intermittently impede reception of the signal) and/or when using a large number of beacons. The applicant has recognised that a pure repeating signal may be of limited use, as it is not secure and can be spoofed by simple recording and recreation of the beacon signal. Thus, embodiments of the present disclosure divide the transmission packet into separate identification and verification sub-packets. By separating the repeating data signal into a fixed identification sub-packet and a varying verification sub-packet embodiments of the invention may provide both more reliable and efficient identification, whilst still providing a secure system that cannot be easily replicated.

An advantage of embodiments of the invention may be in addressing the asynchronous nature of the communication channel between a wearable and a video analytics system and the fact that the network components and decoding of the video stream both can occur independent of any clock-based mechanism, frames can be delivered from the camera/sensor at any time.

In embodiments of the invention, the video analytics system may identify the fixed part of the signal (for example matching the repeating signal using autocorrelation methods) and then use this as an initial anchor. This may provide a highly error resilient approach to identifying the signal even in a real-world environment. Once the anchor into the signal has been established the video analytics system can use the changing sub-packet to verify the signal. The verification code may prevent simple cloning of the signal (for example from a recording) since the constantly changing code would be required to remain correct from one packet to the next. It may be appreciated that there may be several ways to use the code in the changing sub-packet as a verification code. For example, the sub-packet may be used as a value in a checksum algorithm. In some embodiments a public-private key may, for example, be used to generate the security code with for example the key operating on the on the beacon ID and/or a time stamp.

In some embodiments, the video analytics system may monitor sequential changes to the binary code in the second sub-packet. This may allow the signal to be verified once several packets have been received. Advantageously, this may greatly reduce the statistical probability that the signal could be spoofed even when only a short codeword is used.

In embodiments the binary signal may include a divider signal to provide an indicator of transition between the sub-packets. A divider signal may also be provided as an indicator between consecutive packets. The divider signal may be a unique pattern not included in any other portion of the binary signal. For example, the divider may be a repeated sequence of bits which is not present elsewhere in the signal. The use of a divider may be arranged to provide a self-synchronising code.

The applicant has identified one possible divider signal would be to use two consecutive 1 signals in the binary code and to ensure that no other "1,1" signal is present in the binary coding. One convenient way the applicant has identified of achieving such a coding is to utilise Fibonacci coding. As such, the first and second sub-packet may both comprise binary sequences encoded using Fibonacci coding. Fibonacci coding represents integer numbers using code words based upon the Fibonacci numbers with each code word always ending with "1,1" and no other instances of "1,1" being present in the code word.

The plurality of transmission packets may have a fixed bit length. It will be appreciated that a relatively short transmission packet bit length may enable faster identification and/or more reliable tracking (since less video frames must be decoded) but that longer bit lengths may enable the use of a greater number of beacons and/or more complex and secure verification code. As such, in some embodiments the bit length may be selectable during system configuration. Additionally or alternatively, the bit length may be defined based upon the physical constraints of a particular implementation. For example, the frame rate of the camera(s) or the illumination parameters of the at least one light emitting elements may be system constraints. In some embodiments the system may, therefore, have pre-defined packet length limits based upon the physical system between which the system may be configured.

The applicant has found that a bit length selected such that the transmission packet is less than 1 second may be useful. In some embodiments the transmission packet may be set such that at least two complete packets can be transmitted/received in 1.5 seconds. If the bit rate is approximately equal to the frame rate of the camera (and assuming a typical current IP camera operating at 25 frames per second) a transmission packet length of approximately 1.75 secs would, for example enable the transmission packet bit length to be 18 bits.

For any selected transmission packet length, the length of the respective identification and verification sub-packets may also constrain the system in use. For example, the length of the identification sub-packet may limit the total number of beacon IDs available to the system. Likewise, the length of the verification sub-packet may determine, or limit, the security level of the system. In an example having an 18-bit packet length and using Fibonacci coding, the identification sub packet could be 12 bits allowing for 232 unique IDs and the verification code could be 6 bits. A 6-bit verification code would enable 12 possible Fibonacci codewords which over multiple packets may provide a high level of security (for example over two packets the chance of replicating the correct codeword being 1/12×12). With the same parameters, more IDs could be made available by selecting a 15-bit identification sub-packet and leaving 3 bits for the verification sub-packet. This example would make 986 unique Fibonacci coded IDs available. Whilst the codeword would only have 2 possible values (3 bits using Fibonacci coding) verifying over multiple packets could be used to mitigate the reduced security if required. In some embodiments the user could even configure the system to have a zero bit-length verification code if a very large number of beacons were to be used without any security verification (and it may be appreciated that such an embodiment would still be considered to fall within the scope of the invention since it would remain a system configured for a two-part sub-packet including an identification code and a verification code).

It is desirable that the beacon operates entirely independently of the camera and/or video analytics system such that the system is fully passive. As a result, a potential cause of incorrectly capturing the transmitted binary signal, is if the timing of the switching of the light signal from the emitter falls into a timing window in which the individual bits of data substantially span two separate captured video frames. For example, a binary signal of an on/off flash (1,0) received with the first bit (1) spanning both frames could be wrongly recorded as two on signals (1,1) since both frames will be at least partially illuminated. One way to address this problem is to select the relative bit rate of the transmission and the receiving camera such that each bit spans two frames of the video data stream. However, this approach significantly impacts the efficiency of the system (requiring either slowing the transmission or reducing the frame rate of the camera). The applicant has now identified a solution to this problem which does not require such a significant compromise. In some embodiments, the controller may include jitter in the actuation sequence.

This is considered novel and inventive in its own right and, as such, in a further aspect of the invention there is provided a video surveillance system comprising: at least one camera to observe a surveillance field and provide resulting video data; at least one beacon comprising at least one light emitting element and a controller providing an actuation sequence to the light emitting element such that it emits a binary signal comprising sequential on/off flashes; and a video analytics system comprising a processor configured to receive video data captured by the at least one camera and analyse the video for the presence of light emissions from a beacon and identify the beacon using the actuation sequence; wherein the at least one camera and at least one beacon are non-synchronised and the controller includes jitter in the actuation sequence.

The inclusion of a small quantity of jitter into the binary signal may ensure that the timing between the camera frame rate and the switching of the illumination source cannot remain out of sync for an extended period (for example more than a few frames/bits). The added jitter may result in the signal and camera drifting into and out of phase, but the phase variation ensures that for the vast majority of the time the camera and signal will be suitably in phase. The applicant has recognised that the disadvantage of occasional miss-allocations due to phase shift resulting from the jitter may be significantly offset by the overall reliability of signal capture and the benefit of being able to use the full frame rate of the camera. Further, systems in accordance with methods of the invention are intended to operate in noisy real-world environments, such that any signal loss due to the phase shift provided by the jitter will be relatively minor as a source of missed or erroneous data.

In embodiments the introduced jitter may, for example, be a variation in the phase timing of the signal of less than 5%. For example, a 25 FPS camera would have the shutter open for approximately 40 milliseconds for each frame. The frame rate and the bit rate of the binary signal are approximately matched. As such the bit time may also be approximately 40 milliseconds. A jitter of 100 microseconds could be introduced into the binary signal. The jitter may for example be less than 1% of the pulse rate of the signal (for example approximately 0.25%).

It will be appreciated that the video analytics system can use a range of mechanisms to help identify the emissions of the beacon against a dynamic background in a real-world application. Whilst such techniques may be highly effective, they are also computationally demanding and even the most effective techniques remain inherently error prone. Accordingly, it is desirable to ensure that the signal from the captured video stream is as clean as possible, as a means to minimise subsequent processing errors. In typical embodiments the, or each, light emitting element may be an Infrared LED. The applicants have recognised that such infrared LEDs produce very high luminance values when captured in a video stream (for example 255 in an 8-byte greyscale image). As such, in some embodiments the level of light captured in the video stream may be reduced to suppress background noise (reflected environmental light) without compromising the capture of the beacon signals saturating the cameras sensor (since they are point lights, they remain significant). In some embodiments, the at least one of the camera or the video analytics system is configured to effectively reduce background light detection. If the light detection of the camera is reduced (for example by a physical and/or electronic filter) the pixels illuminated by the beacon may remain saturated due to the intensity of the emissions provided by the infrared LED. For example, a luminary threshold filter may be applied. The threshold filter may, for example, isolate only pixels above a selected threshold luminary value. This would act to isolate the emissions from the flashing beacons alone and filter out background noise.

An alternate method (which could also be used in conjunction with a threshold filter) of reducing the background light detection would be to adjust the shutter speed of the camera. In doing so. it may also be necessary to dampen any gain that the camera would otherwise apply electronically to the frame (for example to automatically compensate when the shutter speed is adjusted). This may have the advantage of being electronically controlled and not requiring any additional devices to be added to the camera. Further, reducing the shutter speed also reduces the chance that the system will capture the transition from one bit state to another and misallocated a 0 bit as a 1 bit as discussed above. Thus, reducing the shutter speed has two independently beneficial effects on the process of capturing a clean signal from the wearable emitter device.

By adjusting the camera to substantially reduce (or even eliminate) light captured from background sources it may be appreciated that the camera effectively becomes a beacon sensor. In many applications it may, however, be advantageous to have a normal (i.e. human readable) video output from the surveillance system. It may be possible to duplicate the video data stream and apply an effective luminary threshold filter to only one version of the stream for use by the data analytics system. In some embodiments the system may comprises paired cameras to capture parallel video data streams. One camera may capture video data stream with reduced background light detection (for use in beacon identification). The other camera may capture a conventional video stream. The streams may be stored for side-by-side recall and analysis (for example the video analytics system could superimpose the beacon identification data onto the conventional human readable video). In other embodiments the beacon signal may be clearly distinguishable from the background noise by luminance value. One a threshold has been applied to extract the luminance signal the background noise is then subjected to normalisation into the full width of the luminance histogram. In this way a single camera is able to produce both machine readable signal data and human understandable video.

According to a further aspect of the invention a video surveillance system comprises: at least one set of paired cameras to observe a surveillance field and provide resulting video data; at least one beacon comprising at least one light emitting element and a controller providing an actuation sequence to the light emitting element such that it emits a binary signal comprising sequential on/off flashes; and a video analytics system comprising a processor configured to receive video data captured by the at least one set of paired cameras and analyse the video for the presence of light emissions from a beacon and identify the beacon using the actuation sequence; wherein the at least one pair of cameras is arranged to capture a first video data stream with reduced background light detection and a parallel conventional video stream.

The light emitting element may emit infrared spectrum light, for example the light emitting element may be one or more infrared LEDs.

According to a further aspect of the invention there is provided a method of video surveillance monitoring, the method comprising: providing at least one camera to capture video of a surveillance field; providing at least one beacon to transmit a binary signal comprising sequential on/off flashes, providing a sequence to the beacon comprising a plurality of transmission packets, each repeating an encoded set of data, and wherein each transmission packet comprises a first sub-packet having fixed code and a second sub-packet which changes between transmission packets. The method further comprises analysing video from the at least one camera to detect beacon output within the surveillance field, determine the beacon identity using the first sub-packet, and authenticate the identity using the sequential changes of the second sub-packet.

It will be appreciated that features described above with respect to system embodiments may also be applicable to embodiments of the method.

It may be appreciated that embodiments of the invention may enable a video surveillance system to automatically identify known users entering and passing through the surveillance zone. Embodiments can operate in a fully automated environment without the need for human input since the beacon and video analytics system of embodiments advantageously provide a machine-to-machine verification/identification approach.

The beacon may use any convenient light emitting element and the selection may depend upon environmental factors (for example the range of detection required in a particular application or ambient lighting conditions). However, in some embodiments the light emitting element may emit light from the non-visible spectra. References herein to non-visible spectra light may be understood to refer to electro-magnetic spectra which falls outside of the portion which is normally visible to the human eye (which may, for example, be wavelengths between approximately 380 to 740 nm). Infrared light emitted from a source, such as an infrared LED is, for example, generally considered non-visible light, even though some secondary wavelengths emitted by the LED may be observable as a dull red glow to the human eye.

In embodiments, the camera may comprise a sensor for detecting non-visible spectra light. The use of non-visible light is advantageous, in ensuring that the beacon is not distracting or a nuisance. Further, a non-visible light beacon may be preferable for security purposes, since the coded actuation sequence of the beacon is concealed from normal human observation.

The non-visible light employed may be of an infrared wavelength. As such, the light emitting element may emit light in the infrared spectrum. For example, one wavelength of the infrared spectrum may be at or around 850 nm. The camera may include a sensor that is attuned to be sensitive to light transmitted at a wavelengths of 850 nm. Advantageously, camera equipment which can detect 850 nm wavelength Infrared is readily commercially available since "commercial of the shelf" CCTV cameras use LED's at this wavelength as floodlights ("often called black light in marketing material"), to covertly illuminate low light scenes. If it is desirable to further reduce the visibility of the beacon to the human eye, light emissions of a lower wavelength (such as 920 nm range) could be utilised. It will however be appreciated that photons of such a lower wavelengths have less power and therefore provide less illumination.

The system may comprise a plurality of beacons, for example, for attachment or use by a plurality of persons or objects. In such embodiments the controller of each beacon may provide a distinct coded actuation sequence. For example, the controller may allow one of a predetermined plurality of coded actuation sequences to be selected, for example, during an initial configuration or updating of the beacon. Alternatively, the controller of each beacon may be pre-programmed with a uniquely coded actuation sequence. The processor of the analytics system may can access a machine-readable storage comprising a database of unique identification keys for a plurality of beacons.

The system of some embodiments may comprise at least, a first camera (or first pair of cameras) to observe a first surveillance zone and at least a second camera (or second pair of cameras) to observe a second surveillance zone. The processor may be further configured to use the verified identity of the beacon to track movement over time through the first and second surveillance fields. Thus, some embodiments may advantageously provide a system which is able to track movement of a single subject from camera to camera across a time period and security zones. Further embodiments could be arranged to carry out such multi-camera tracking even in a crowded environment in which several beacons are present by verifying the individual beacon identities.

The beacon may comprise a plurality of light emitting elements. The actuation sequence of each light emitting element may be synchronised. For example, the light emitting elements may each light simultaneously in accordance with the coded actuation sequence (such that the elements are effectively acting as a combined light source). In some embodiments the synchronisation of the light emitting elements may use one or more elements as individual light sources in providing a coded actuation sequence (for example a row of elements could be utilised together to provide a number of "bits" when activated).

When a beacon includes a plurality of light emitting elements this may also provide further advantages to the system. For example, multiple elements may have different positions or orientations to increase detectability by the video camera. If at least two of a plurality of light emitting elements are spaced apart by a known spacing distance the processor of the video analytics system may be configured to derive a depth location of the beacon within images from the video data using the spacing distance of the light emitting elements in the video data. In some examples a single beacon could include light emitting elements with a set spacing or alternatively multiple beacons could be placed on a subject or object at a set spacing apart.

In some embodiments the beacon may be a wearable device. For example, the beacon may be a lanyard. The beacon may be a unit which is connected to an existing lanyard or may be integral with a lanyard. The beacon may be configured to attach to an item of clothing. For example, the beacon could be incorporated into an identification badge or could be attached to or integrated in epaulettes, in, by way of example, the uniforms of security personnel.

The video analytics system may provide an alert or notification in response to meeting a/some predetermined criteria, derived from observation of the beacon, within the surveillance zone. Alerts or notifications may be triggered based upon beacons being identified within the entire surveillance area of a particular camera or based upon a defined sub-zone or area (which could extend at least partially across the surveillance field of a plurality of cameras).

The alert or notification could be triggered either remotely or locally and could, for example, be dependent upon the identity of the beacon. Advantageously, since embodiments of the invention may enable unambiguous identification with a high degree of reliability, for any given beacon, the alert or notification could be based upon a particular group of identities (for example certain personnel roles) or a specific individual's identity. The video analytics system of embodiments could be connected to a machine-readable storage (for example a database stored on a server), which may provide heuristic rules specifying the criteria to grant access to the area or zones covered by the at least one surveillance field. For example, individual records could be maintained indicating days and/or times when a particular identification is or is not permitted within the area. As such, notifications or alerts provided by embodiments of the invention may be highly tailored to the system users requirements for alert provision.

Whilst embodiments of the invention could be implemented on a local area network basis (and indeed, for high security environments, an air-gapped network may be a preferred configuration), typically greater flexibility may be achieved by configuring a system in accordance with embodiments to operate over a wider network. For example, the system according to some embodiments, may further comprises a network for receiving video output from the at least one camera and transmitting video data to the video analytics system. The video analytics system could, therefore, be remotely located relative to the area under surveillance. For example, a cloud-based system could be provided, in which a single centralised video analytics system could be employed, consuming video data from a plurality of cameras which themselves are positioned in a plurality of surveillance locations.

In some embodiments, the security zone is observed by at least two cameras, which may for example be arranged in close physical proximity. A first camera may contain an "IR cut filter" that blocks light at the same wavelength as the beacon emits light. The second camera may contain no such filter and so is sensitive to light in the beacon's IR wavelengths. The video analytics system may be configured to make a comparison of synchronised video output from the two cameras. For example, the comparison may calculate a differential in the luminescence of pixels in the videos. This may enable the video analytics system to locate bodies of high intensity IR pixel locations and the luminance frame can be scanned for such locations. These locations may represent a 1 in the beacon encoding scheme. The absence of the beacon at a previous locus of observation represents a 0 in the encoding scheme. By capturing the 1's and 0's of the beacon over a time series, complex encoding schemes, transmitted by the beacon can be ingested by the video analytics system.

In alternate embodiments an IR cut filter may be necessary. For example, a "running average frame" may be determined by the video analytics system. Subtracting the current frame from this running average frame (and for example then applying a luminance threshold) may provide a difference frame that represents the moving foreground objects in the frame with background clutter removed. If the threshold is of a high value, then the resultant difference frame will indicate solely the location of the beacons within the frame from which the signal can be extracted in a time series by the video analytics system.

In some embodiments, the movement of objects in the scene may be tracked. Multiple, known computer vision techniques could be incorporated into embodiments of the invention. In some embodiments of the device the encoded beacon sequence is attached to a single moving object to allow decoding the sequence on a per object basis over a time sequence and allow identification of multiple beacons in a single frame in difficult environments.

Embodiments of the invention may provide a mechanism to store the data or meta-data. This data may be kept in memory and/or analysed live by the video analytics system and/or placed into a database where it can be analysed at a later date. Such analysis could be to derive associations amongst the data that is only visible from a prolonged time series, such as the number of times in a day that a security guard has entered an area. In another embodiments searching for and finding an incident on historical data then allows the partnered video data to be observed and interpreted by human operators.

The data or metadata collected by the video analytics system may include one or more of the following: the camera number, the pulsed flashes of the beacon, the beacon signal strength (number of pixels), the beacon centroid location (X,Y), the beacon's derived Z location (from a pinhole camera model, from a 3D camera using stereoscopy or structured light or range finding technology), the beacon's derived Z location from the separation of matching beacons on a single object and passed through a range finding algorithm, the time of the observations. In some embodiments the Meta data such as the beacon identification tag derived from a lookup table could also be stored in the database.

In some embodiments, the controller may include a machine readable storage medium containing instructions executable by a processor the medium comprising: instructions to obtain the stored unique identification key for the beacon; instructions to obtain a time-based or sequence-based value; instructions to use the stored encoding algorithm to derive a unique code as a function of the identification key and value; and instructions to output an actuation sequence based upon said unique code for the light emitting element.

Embodiments of the invention may provide a real time locating system.

Embodiments of the invention may be used to provide a digital identification (using the verification systems and methods described herein) which is then used for establishing a secure communication connection. For example, embodiments could establish a digital handshake or pairing between devices using embodiments of the surveillance system. In embodiments, the surveillance system or method of embodiments may be used to verify the identity of at least one beacon within a surveillance field and the identification may then be used when establishing a connection, for example using a wireless connection protocol. In such embodiments the surveillance system may for example be connected to a communications system. It may be appreciated that such an arrangement can provide an additional level of security to a system by confirming the physical location and/or presence of a device/user within a surveillance field before information is shared via a communication system. The wireless protocol could for example be wi-fi, Bluetooth or another readily available system. Advantageously, using the embodiments in such a manner may overcome limitations of existing systems such as the use of NFC to assist pairing (which can typically only operate over short distances).

Whilst the invention has been described above, it extends to any inventive combination of the features set out above or in the following description or drawings.

BRIEF DESCRIPTION OF THE DRAWINGS

Embodiments of the invention may be performed in various ways, and embodiments thereof will now be described by way of example only, reference being made to the accompanying drawings, in which.

DETAILED DESCRIPTION

Figure 1:
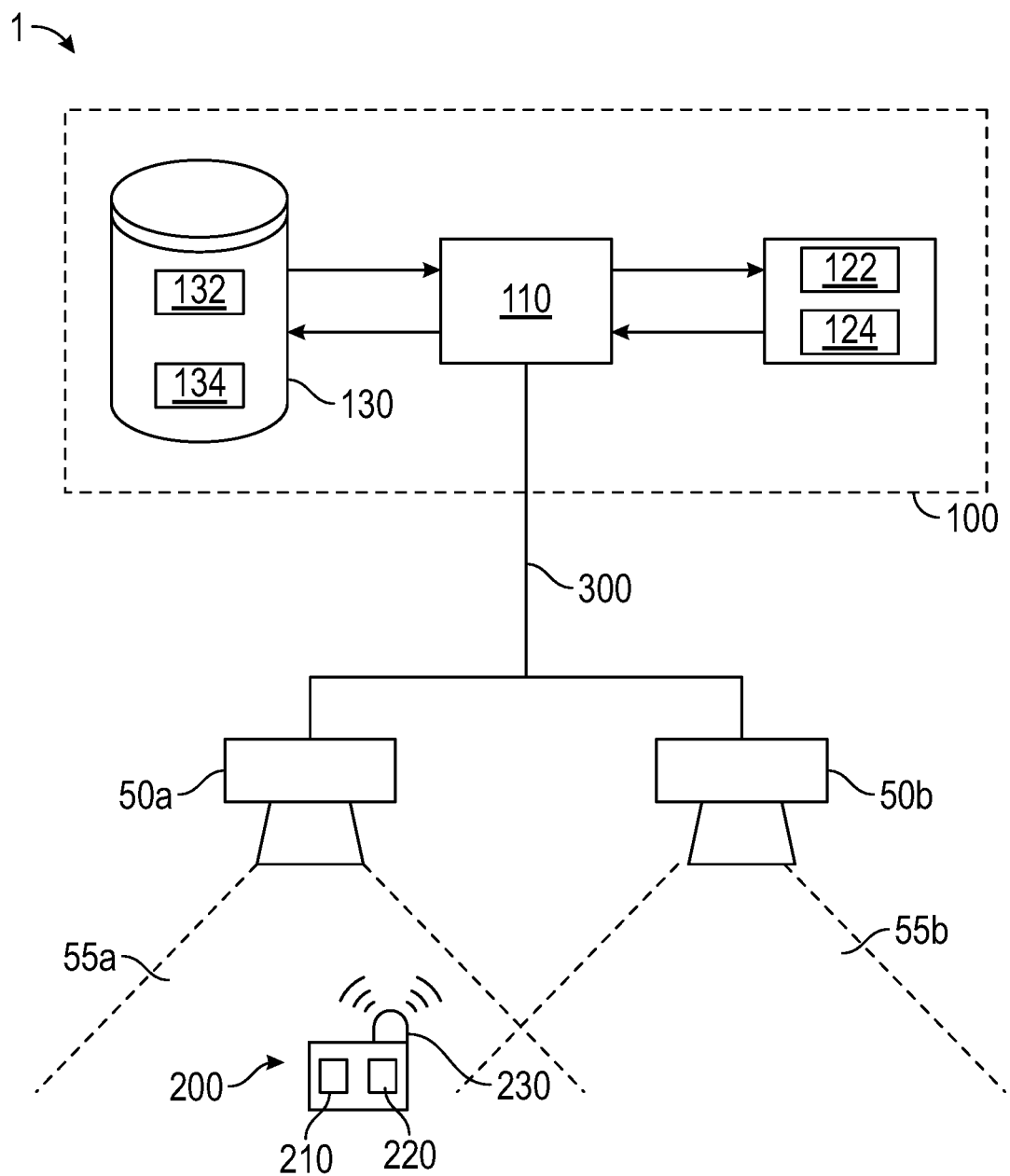
FIG. 1 is a schematic representation of a video system for use in embodiments of the invention.

A video surveillance system 1, suitable for use in embodiments of the invention is shown in FIG. 1. It may be noted that such a video surveillance system is also disclosed in our co-pending patent application GB1916245.2 (filed 8 Nov. 2019) but for completeness the system will be described in full below.

The system comprises a video analytics system 100, a plurality of video cameras 50, connected to the video analytics system 100 via a network 300 (which could, for example, include the Internet), and at least one beacon 200. In the illustrated embodiment, two cameras 50a and 50b are provided with each capturing video covering a related surveillance field 55a and 55b. The video data is transmitted over the network 300 which could be a wired or wireless network and may be local or cloud based.

The, or each, camera 50 may be sensitive to light at infrared wavelengths. Security cameras which are optimised for sensing Infrared radiation are commercially available (and may typically be used in prior art systems, with an infrared spectrum spotlight illuminating the scene with "black" light, which though invisible to the human eye can be detected by the specifically attuned sensor in the camera). Infrared video cameras may be tailored to be sensitive to a specific region of the infrared spectrum. For example, Infrared cameras sensitive to 850 nm range wavelengths are particularly common.

The video analytics system 100, comprises a processor 110, in communication with a data store 130 and a storage medium 120. It will be appreciated that the video analytics system 100 could be a network connected computer. The analytics system could be in communication with a plurality of separate camera systems and separate networks (with network comprising one or more cameras). It will be appreciated that, for example, a single networked video analytics system could be provided (for example, at a service provider) to operate a plurality of distinct surveillance systems (for example, each at separate client locations). As networked video surveillance systems are now relatively well established, it will be appreciated that embodiments of the invention could be implemented by taking advantage of existing systems with relatively simple modification and/or minimal hardware changes required.

The storage medium 120 may contain executable instructions 122, 124 for the processor 110. The storage may, for example, include random access memory (RAM) or read only access memory (ROM) and may be any convenient electronic, magnetic optical or other physical storage device. The data store 130 may, for example, include locally stored data files, databases, websites, FTP servers and the like. As will be explained further below, the data store may be used to keep records relating to the system for use by the processor 110, such as access rules and beacon identities.

The beacon 200, may typically be a wearable device such as an identification badge or insignia. The beacon 200 may include a power source 210 such as a battery. A controller 220 is included, to control the beacons signal through light emitting element such as at least one LED 230. The controller 220 may for example, be an integrated circuit. The controller may include an input, which could, for example, be a wireless connection such as Bluetooth or Wi-Fi, to enable the initial configuration and/or set-up of the beacon.

The light emitting element 230 may be selected depending upon the properties of the light for which the camera(s) 50 are attuned. As explained further below, the controller 220 will generally cause the LED 230 to flash or pulse. By using an infrared LED the pulsing of the LED is generally of very low observability to the human eye. Infrared LED's are increasingly compact and powerful (due to Haitz's Law), enabling easy integration into a beacon, which itself will thus be relatively compact and therefore wearable. The Infrared LED's of the type used, for example, in "black light" spotlights for CCTV equipment, radiate large volumes of light in the Infrared range distributed around 850 nm. In operation, they generally also produce a very dull red glow that is barely visible to the human eye and only at close range. As such, whilst a pulsing LED 230, used in an embodiment of the invention, would be barely visible, it is unlikely to remain completely invisible to an observant subject. A user may find such a visible emission distracting. As such, in some embodiments, the beacon 200 may further comprise at least one masking LED at the same wavelength of the human observable red glow emitted by the infrared LED 230. Such a masking LED would provide a means to hide the pulsing Infrared light emitted from the infrared LED 230 from human observation. A further advantage of including a masking LED would be that it could provide visual confirmation that the wearable is operational and its current state (for example, low on battery power, communicating through a wireless signal, recharging the battery and so forth).

Alternatively, some embodiments of the beacon 200 could employ Infrared LED's transmitting data in the 920 nm range. Such LEDS are completely invisible to the human eye but suffer from the disadvantage that video cameras that are optimised to receive signals at this wavelength are less readily available than their 850 nm counterparts. Further, 920 nm LED's, having a longer wavelength have less energy than those at 850 nm. As such, 920 nm range LED's generally provide less illumination to act as a beacon.

Advantageously, modern Infrared LED's are typically visible in daylight to a distance of 30 m, even in full sunlight. Further the use of multiple LED's can provide pulsing illumination in parallel and thereby increase the operational visibility and range of embodiments of the system. In some embodiments it may be desirable for the controller 220 to adjust the brightness of the emissions from the light source 230. For example, the beacon 200 may further comprise a light sensor to allow ambient light information to be provided to the controller. Such an arrangement may enable the brightness of the LED's to be maximised in well lit situations (to increase range) but avoid LED acting as a source of scene flooding, when light is low (which may otherwise reduce the ability of the system to isolate the beacon signals).

The emission pattern of the LED(s) 230 is governed by the controller 220 and varies over time to provide an encoded signal which can provide an identification of the beacon. For example, the LED(s) 230 can be commanded to emit a signal such as a simple series of on/off saw tooth switches over a time series. Personnel of one category could have one set of signals encoded in the lights on/off pattern whilst others would have a different pattern. It will be appreciated that brightness, duration, and many other factors could be employed to produce these different patterns. Further, if multiple LEDs are provided and controlled individually (but in a synchronised manner), then this may provide an additional level of complexity which can be encoded into the light emissions (for example each light could be treated as a separate "bit" of information). Advantageously, providing a fine-grained identification pattern that could enable the encoded signal from the beacon to identify not only a group of personnel but also a unique individual.

For the purposes of increased security, it may be preferred to provide encoded signals for the beacon which are not constant over time. This may avoid third parties observing and duplicating a signal to "clone" the identity of that beacon. Accordingly, in the system of GB1916245.2 the controller 220 may use an encoding algorithm to generate the output signal for the emitter 230. It may be appreciated that such an encoding algorithm could be similar to those used to generate one-time identification/access codes (for example for secure access to websites over the internet). Such algorithms are well established and can, for example, combine a unique identification key allocated to the beacon with a time or sequence based value, to generate an output to be used as a signal. For example, the signal may be a numerical value which is then emitted by using a particular coded sequence of pulses or flashes for each digit.

Figure 2:
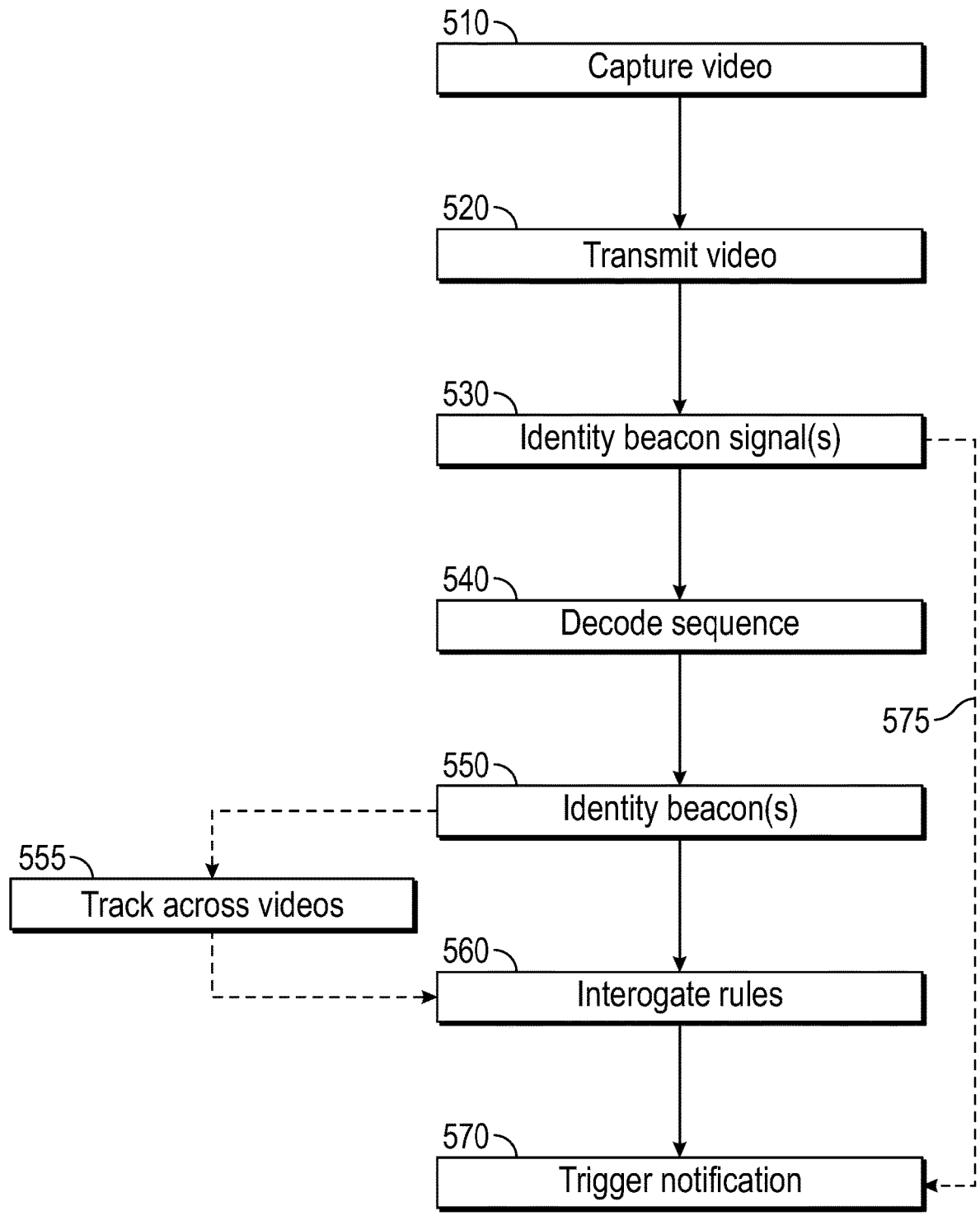
FIG. 2 is a flow chart representing the method of operation of the video system of FIG. 1.

Operation of the system of FIG. 1 will now be described further, with reference to the flow chart 500 of FIG. 2. It will be appreciated that the method may be most effective in a live system but may also work on historical/stored video data. In step 510 the camera(s) 50, monitor a surveillance area 55, capturing video data. In order to maximise the available bandwidth, the video data may be encoded to a compressed bit stream such as a video stream conforming to the H.264 format, which may then be transmitted, over network 300, to a video analysis system 100. Should the video analytics system receive the video stream in an encoded/compressed format, it is then decoded back to raw video by hardware or software by the processor 110, prior to image processing as the first step to extract useable data for machine understanding of the scene.

As represented in box 530, the processor 110 of the video analysis system 100, interrogates the video data, to identify any beacons signals from the beacons 200, that are present in the captured, transmitted, and decoded video frames. The processor 110, may for example, use a first set of process instructions 122 stored on the memory 120 to carry out the video analysis steps required to identify a beacon emission in the video frame.

Once the presence of a beacon 200 has been identified in a video stream/recording, the analysis system 100 will proceed to decode the light sequence emitted by the beacon 200. The processor 100 executes the decoding instructions 122 stored on the memory 120. The decoding instructions 122 will include the same algorithm as used by the controller 220 and will have a corresponding counter or clock synchronised with that of the controller. The decoding step 540 may for example, provide an identification key which the processor 110 can then lookup on a table 132 in the data storage 130 to provide an identification of the beacon 200 in step 550.

Once the beacon 200 is identified, the processor 110, may further look up the identity in a set of access control rules 134 stored in the data storage 130. If appropriate the analysis system 100 may then trigger a predetermined notification and/or alert in step 570. For example, an alert could be issued if a person without the required access rights enters a particular area or if a person enters an area at a non-authorised time. It should also be noted that some alerts could be triggered (as shown by line 575) in the event of a subject, for example identified by image recognition, being detected when a beacon signal has not been identified. It will be appreciated that the notifications/alerts triggered may depend upon the installation and/or user preferences such that the control rules 134 may also include a record of types of alert to be issued depending upon the situation detected. Further, the alerts may also be sent to the bearer of the wearable by sending a message to their mobile phone by SMS or a notification system or application.

In some embodiments, the identification of the beacon in step 550 may be further used to identify or track movements of the related user/objects. Such a step 555 may be used to back-track movement of a subject across areas monitored by multiple cameras (which may or may not be located in proximal areas). Advantageously, this may enable tracking of multiple subjects across multiple locations even in a crowded environment.

Embodiments of this disclosure provide a method to extract the beacon pulses from the background elements of the video stream. To one skilled in the art it would be understood that the computer vision algorithms described herein are merely exemplars of a plurality of algorithms that could be employed to this effect and that other algorithms in addition to those specificity described are available to achieve the same ends. In one embodiment, the security zone is observed by two cameras in close physical proximity. The first camera contains an "IR cut filter" that blocks light at the same wavelength as the beacon emits light. The second camera contains no such filter and so is sensitive to light in the beacon's IR wavelengths. Frames are derived from the two cameras, with each frame taken within a short time period relative to the other (so the frames are synchronised in time series). Pixel values from the luminance of these frames are then subtracted from each other and a luminance cut-off threshold applied to the resultant pixel difference frame. The threshold value applied can be chosen by numerous techniques known to one skilled in the art, such as mean global pixel value of the difference frame. The thresholded difference frame, will now show the location of bodies of high intensity IR pixel locations and the luminance frame can be scanned for such locations. These locations represent a 1 in the beacon encoding scheme. The absence of the beacon at a previous locus of observation represents a 0 in the encoding scheme. By capturing the 1's and 0's of the beacon over a time series, complex encoding schemes, transmitted by the beacon can be ingested by the video analytics system.

In a further embodiment a single camera captures the luminance frame without an IR cut filter. The previous frames of the time series are kept as a "running average frame" and subtracting the current frame from this running average frame and then applying a luminance threshold yields a difference frame that represents the moving foreground objects in the frame with background clutter removed. If the threshold is of a high value then the resultant difference frame will indicate solely the location of the beacons within the frame from which the signal can be extracted in a time series by the video analytics system.

It is noted that the colour value of the IR beacon may be bright white. Thus, in a further embodiment of the system, the difference frames derived as described above, are calculated using colour values (in RGB/YUV/HSV or other format), rather than luminance pixel values. The difference frame is then filtered to only show near RGB white values, and the location of these white values are used to denote the beacon signal derived from colour frames.

It is also noted that the algorithm described above is a functional solution when employed to find a beacon signal for a single object in the scene, but this is unlikely to be applicable to all cases and scenes may be encountered in which more than one beacon is present and thus more than one encoding pulse time series will also be present. Moreover, in the observed frames, multiple moving objects carrying the beacons may cross over one another. In this case, the construction of the time series for a single beacon becomes problematic. Thus, in other embodiments, the movement of objects in the scene is tracked. One skilled in the art would know of the multiple computer vision techniques that are available to perform this function. Background foreground segmentation is often used in the first step of a tracking algorithm and these segmentation techniques split pixels into being a member of background clutter model or as a moving foreground object, based on statistical techniques such as Gaussian Mixture Modelling or Code-Book pixel look-ups. Foreground pixels are then passed into sophisticated tracking engines that combine individual pixels into single tracking objects by using connected-component labelling algorithms, in concert with hole filling algorithms (morphological operations). The individual objects are then tracked and compared to a model of expected movement to remove statistically outlying movements and the satisfactory movements recorded by the video analytics system. Yet more computationally advanced algorithms such as optical flow methods or segmentation by Convolution Neural Networks may also be used in tracking functionalities, but in sum, these techniques provide a mechanism to automatically split and track moving objects. In some embodiments of the device the encoded beacon sequence is attached to a single moving object to allow decoding the sequence on a per object basis over a time sequence and allow identification of multiple beacons in a single frame in difficult environments.

Embodiments of the invention provide a mechanism to store the data or meta-data. This data can be kept in memory and analysed on the fly by the video analytics system or placed into a database where it can be analysed at a later date. This analysis could be to derive associations amongst the data that is only visible from a prolonged time series, such as the number of times in a day that a security guard has entered an area. In another embodiments searching for and finding an incident on historical data then allows the partnered video data to be observed and interpreted by human operators.

In embodiments it is envisaged that the following data and meta data could be collected by the video analytics system. One skilled in the art would recognise that this list is not exclusive and that additional elements of data and meta data could prove useful in real-time analysis or be stored for subsequent review. Such data includes: the camera number, the pulsed flashes of the beacon, the beacon signal strength (number of pixels), the beacon centroid location (X, Y), the beacon's derived Z location (from a pinhole camera model, from a 3D camera using stereoscopy or structured light or range finding technology), the beacon's derived Z location from the separation of matching beacons on a single object and passed through a range finding algorithm, the time of the observations. In some embodiments the Meta data such as the beacon identification tag derived from a lookup table could also be stored in the database.

As noted above, the beacon 200 may typically be a wearable device. This could for example, include a badge or wrist band. However, typically the cameras of video surveillance systems are mounted high up, over the area being monitored and therefore it is advantageous to provide a beacon 200 which is located above a subject's waist. For example, in some embodiments, a beacon 200, could be incorporated into an epaulette, which are often present in the uniforms of security, police or military personnel. Epaulettes are worn on both shoulders and as such, at least one is generally visible from an orientation likely to observed by a CCTV camera in a surveillance system; as such, embodiments may take advantage of this by having beacons with synchronised signals on each epaulette (for example a connection such as a wireless Bluetooth or Wi-Fi link may be provided between the pair of epaulettes to enable such set up, or employ a time based signal, which would always be synchronised between time matched wearables). As epaulettes are close to eye level it may be desirable to provide a shield or mirror to direct light from the light emitting elements 230, in a preferred emission direction—typically away from the user's face.

Figure 3:
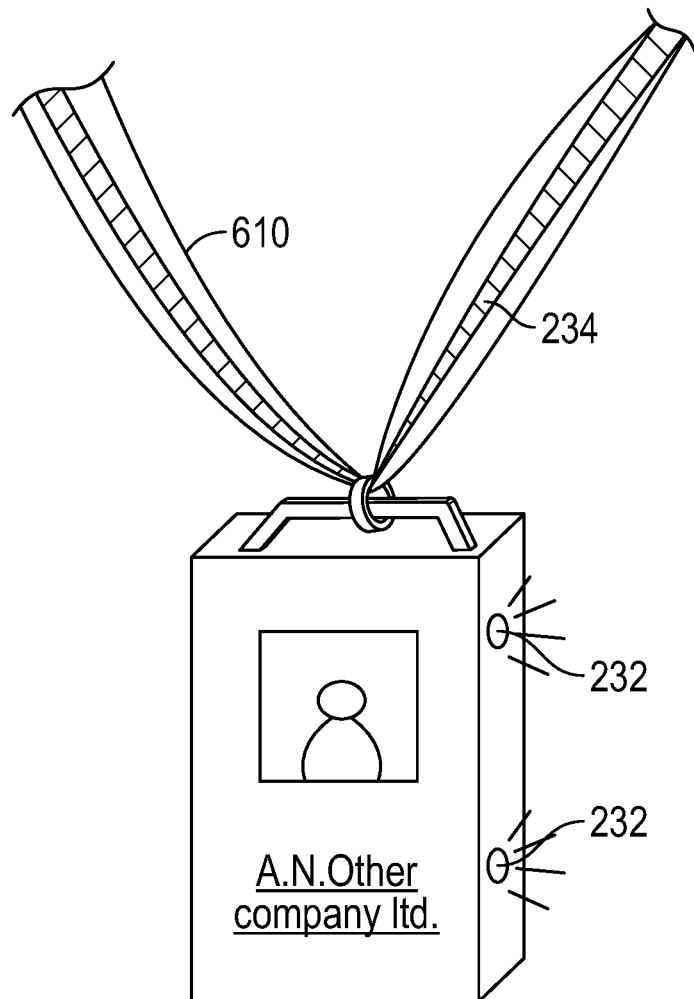
FIG. 3 is a schematic representation of an identity lanyard including a beacon for use in embodiments of the invention.

One implementation of the beacon 200 is represented in FIG. 3. In this embodiment the beacon is incorporated into a Lanyard of the type which are worn around the neck and commonly used in workplaces or at functions and events. Such lanyards generally comprise a cord or strap 610 which is worn around the neck and an identification badge 600 attached thereto. A beacon 200 for use in embodiments of the invention could be integrated into a lanyard or provided as an add-on/modification to an existing lanyard. Components such as the battery 210 and controller 220 may for example be conveniently located within the badge 600 or a holder associated with the badge.

In some embodiments the badge (or associated badge holder), 610 could be provided with one or more light emitting element(s) 232 of the beacon. In other embodiments, the light emitting element(s) 234 could be incorporated into the strap 610 of the lanyard. Such an arrangement is particularly useful as it can enable the element and signal to be visible along a greater area. For example, a transparent or translucent portion of the strap 610 may be provided with multiple distributed LEDs or with LEDs connected to a light diffusing arrangement. This may enable the light emitting element 234 to be visible from all directions including the rear. The light diffusing element could, for example, be formed using optical fibres, light pipes, or flexible light diffusing sheets. An adjacent region of the strap 610 may have a contrasting colour to the light emitting element or associated light diffuser. This may provide increased contrast for the video analysis to assist in identification of the beacon 200 and the pulsed signal.

Figure 4:
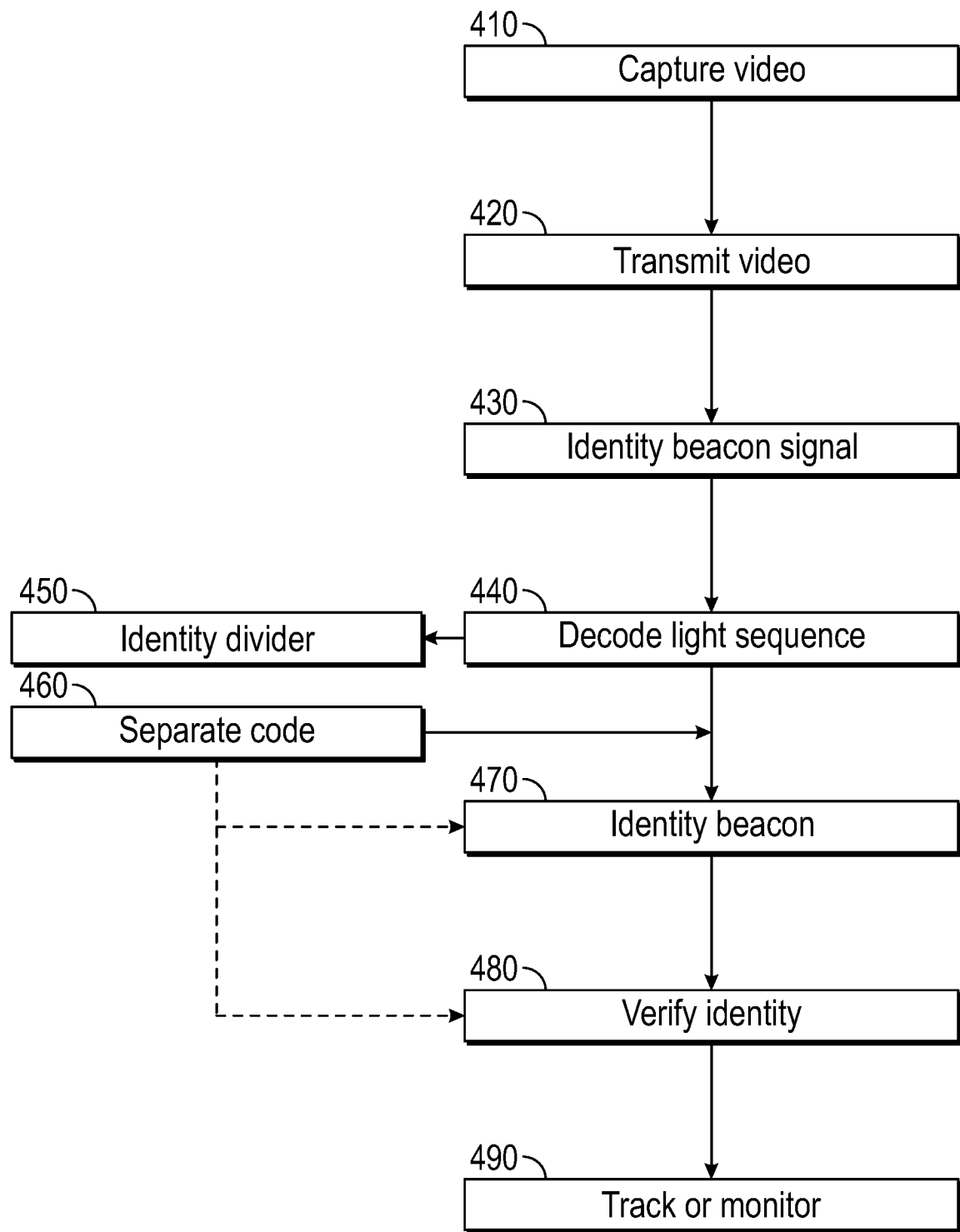
FIG. 4 is a flow chart representing a further method of operation in accordance with embodiments of the invention.
Figure 5:
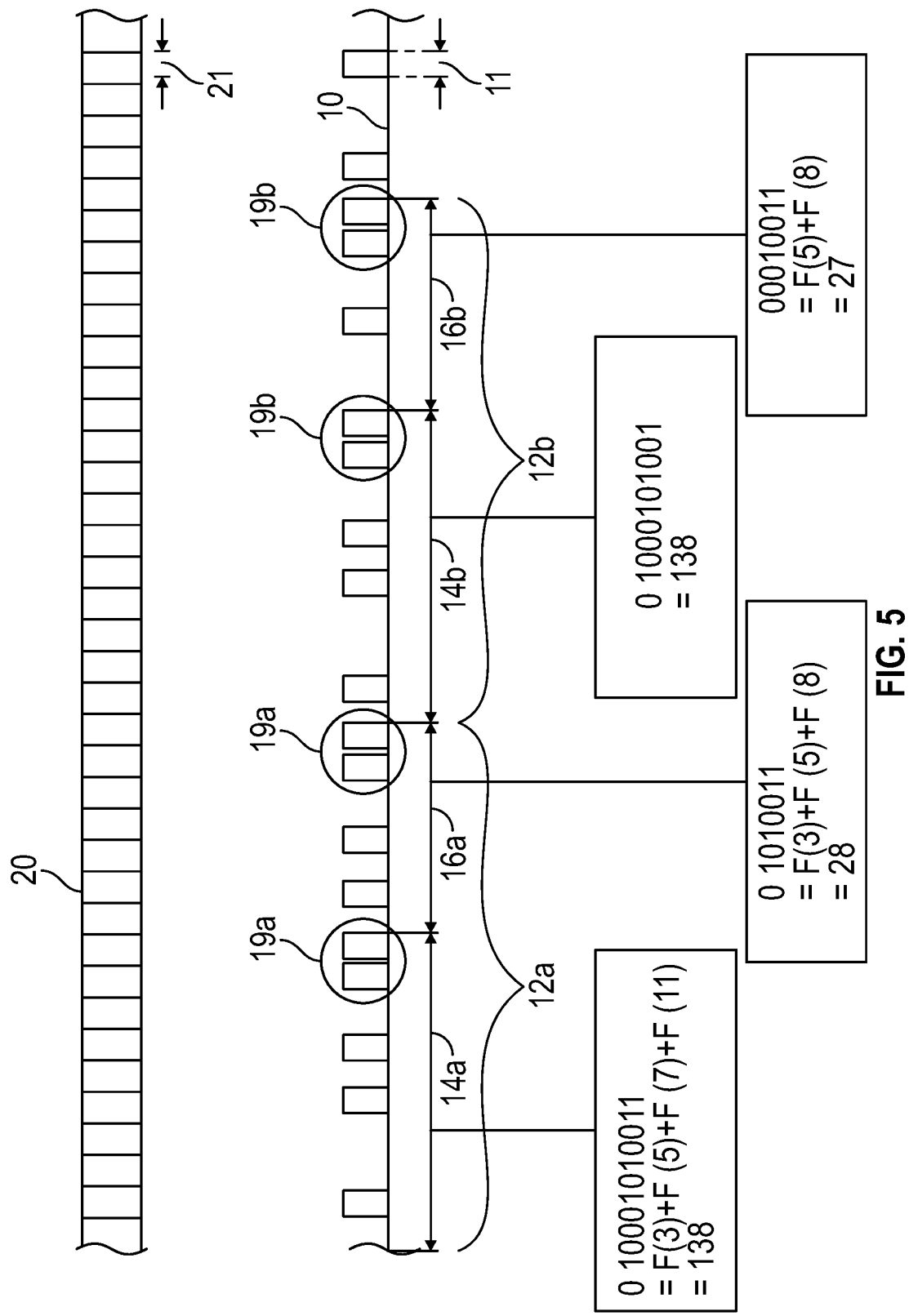
FIG. 5 schematically represent a data signalling approach for use in embodiments of the invention.

The present disclosure further builds upon the above system and method and will be described further with reference to the flow chart of FIG. 4 and the illustration of FIG. 5. Whilst the use of an encoded binary signal from the beacon provides a high level of security the applicant has also found that identification and decoding of a constantly changing signal can be computationally burdensome. Accordingly, a modified method and system is represented in FIGS. 4 and 5 using a two-part signal.

As in the previous embodiments, the controller 220 of the beacon 200 is arranged to provide an actuation sequence to the light emitting element 230, which consists of a binary on/off signal. As represented by FIG. 5, the signal 10 consists of packets 12, each of which represents the repeated set of data that the beacon is transmitting to be identified by the camera 50 and analysis system 100. Each packet 12, comprises a fixed number of individual bits 11, each bit being a binary on/off (i.e. I/O) corresponding to a pulsed light emitter 230. The bit rate of the signal generally matches the frame rate of the camera (as represented schematically by the sequence 20, made up of a series of frames 21 in FIG. 5) such that each bit will be captured by a frame 21 of the video 20.

Within each packet 12, the signal is divided into a plurality of sub-packets. In the embodiments detailed below, two sub packets are described, 14 and 16, however, in other examples, different and/or more numerous combinations of sub packets could be employed. Sub-packets 14, has a fixed code of bits, which repeats in each packet of the signal. This is shown by the identical bit sequences (0,1,0,0,1,0,1,0,1,1) in both first sub-packets 14a and 14b of FIG. 5. The other sub-packet 16 may change between packets, as shown by the non-identical coding bits of the consecutive sub-packets 16a and 16b in FIG. 5. For convenience, it may be noted that the fixed sub-packet 14 is referred to herein as the "first" sub-packet and the changing sub-packet 16 is referred to as the second "sub-packet". The skilled person will of course appreciate that this does not imply an order to the sub-packets but rather serves to indicates that each sub packet is one of two parts comprising the whole packet. In the illustrated example the first sub-packet 14 comprises 12 bits of binary signal and the second sub-packet comprises 8 bits of binary signal. Thus, the total packet size is, in this example, 20 bits. As will be discussed further below the bit length of the packet and the sub-packets may be selected depending on overall requirements of the system.

To assist the video analysis system in distinguishing between consecutive packets 12a, 12b and between the sub-packets 14, 16 the signal 10 can include codes within the bits that serve as a divider. The divider 19a, 19b is a repeated sequence of bits which cannot present elsewhere in the signal. In the illustrated example the divider signal is a pair of 1 bits (i.e. two consecutive pulses of light emitted by the beacon). As will be explained further below, a particularly convenient approach is to encode the signal 10 using Fibonacci coding, since Fibonacci coding represents integer numbers using code words based upon the Fibonacci numbers with each code word always ending with "1,1" and no other instances of "1,1" being present in the code word.

The purpose and operation of the sub-packets 14 and 16 will now be further explained with reference to the flow chart of FIG. 4. As with the previous embodiment, the video system operates to capture a stream of video data in the first step 410 using the camera(s) 50. The captured data is transmitted to the video analytics system 100, for example over a network 300 in step 420. Upon receiving a video stream 20, the analysis system first seeks to identify any beacon signals present in step 430. The repeating nature of the first sub-packet 14 of the signal 10, simplifies the computational task for detecting the signal for the video analytics system 100, providing a repeating anchor into the signal. Thus, the video analytics system 100 can decode the flashing sequence detected in the video data back into a binary signal stream in step 440.

When decoding the light sequence, the video analytics system 100 can analyse the signal to find divider signals 19 in step 450. Identification of the divider signals enables the signal captured in the video data to be parsed into individual packets and sub-packets in step 460.

The repeating sub-packets 14 may then be used to identify the beacon as shown in step 470. As shown in the example of FIG. 5, where the binary signal is using Fibonacci coding, the binary sequence of the fixed portion can be identified as a series bits which may be in the state 1 or 0 and ending at the divider signal (i.e., a 1,1 signal). Each of the individual bits (other than the final appended "1") correspond to the position of a Fibonacci number which can be summed to arrive at the encoded integer number. Thus, the example sequence of FIG. 5 (0,1,0,0,0,1,0,1,0,0,1,1) can be corresponded to the Fibonacci numbers F(3)+F(7)+F(9)+F(11) providing a value of 138. This integer is the ID of the beacon transmitting the signal 10. This sequence and ID is repeated in every one of the fixed sub-packets 14 (as shown for example by sub-packets 14a and 14b) in the signal and is a unique value allocated to a specific beacon 200.

Alongside identification of the beacon ID the separating step of 460 also enables the video analytics system to separate out the second sub-packet 16 and decode its binary sequence which may be different from one packet 12a to the next 12b. For example in the illustration one second sub-packet 16a can be seen to correspond to the bits 0,1,0,1,0, 0,1,1 and the next second sub-packet 16b can be seen to correspond to the bits 0,0,0,1,0,0,1,1. Thus sub-packet 16a is decoded as Fibonacci numbers F(3)+F(5)+F(8) returning an integer value of 28 and sub-packet 16b is decoded as Fibonacci numbers F(5)+F(8) returning an integer value of 26.

The value of the sub-packet 16 is used by the system as a code word and used to verify the beacon identity in step 480. For example, the integer value from the sub-packet 16 of a single packet 12 or the sequence of integer values over several packets 12a, 12b can be used in a checksum. For example, using a public-private key which is shared between the beacon and the video analytics system or using a time-based encoding where the time is shared by both the beacon and the video analytics systems decoding the bits.

Having identified the beacon 200 and verified its authenticity the system may, in step 490, track or monitor the beacon; for example recording a log of its movements within the monitored area or confirming the access rights of the bearer into the monitored area.

The example above uses a 20-bit packet length and with the bit rate approximately matched to the camera frame rate for a typical current IP camera (25 Frames Per Second), this would allow an entire packet to be transmitted/received in less than 1 second. It may be appreciated that the packet length is a trade-off between the amount of data included, in comparison to the time to achieve an initial resolution of the identifier packet and also the reliability of the resolved tracking/identification object. As such, embodiments of the invention may allow the packet lengths to be selected during configuration—for example allowing a shorter packet where fewer subjects are required and thus allowing a quicker resolution of each identification.

Likewise, the size of the sub-packets may be configurable such that the same basic system could be used for a variety of applications. For example, if a system were being used in a high security environment the total number of identifiable beacons could be reduced (reducing the ID sub packet 14), to allow a greater number of bits to be available to describe the codeword portion (the security sub-packet 16 is longer) of the packet. On the other hand, a surveillance or monitoring system used purely for collating commercial Real Time Location data (for example tracking the movement of shopping trolleys through an area) may benefit from the availability of a high number of beacon IDs but require only a very basic verification function from the code word. In such a situation, the ID sub-packet 14 would be maximised and the codeword sub-packet 16 minimised.

An additional parameter, that may provide useful configurability to methods and systems of embodiments, is whether the security code word is verified over a single or multiple (typically sequential) packets. Verification over multiple packets can greatly increase the security even when using a short code-word, since the individual codes are collated over a time period the probability that the entire time series is correct is the probability of each sub-packet being correct to the power of the number of packets collated. The probability of being able to spoof this ever-changing signal by chance alone, gets very small, very quickly. It will, however, be appreciated that verification on a single packet basis is less likely to impacted by signal interference or other environmental factors corrupting the reception of the code word.

For a fully reliable and passive/automated system the camera 50 and video analytics system 100 are not synchronised with the beacons 200. This can result in the risk of misalignment between the switching of the light emissions and the frames of the video capture causing errors, in the reading the state of the beacon, by the video analytics system. This issue is particularly notable when the video frame rate and signal bit rate are matched (which is desirable for the purpose of maximising the data capture and thus speed of identification/tracking). This is schematically illustrated in FIGS. 6A and 6B (and it will be appreciated that the diagrams of FIG. 6 are purely for understanding purposes and are not intended to be in any way to scale).

Figure 6A:
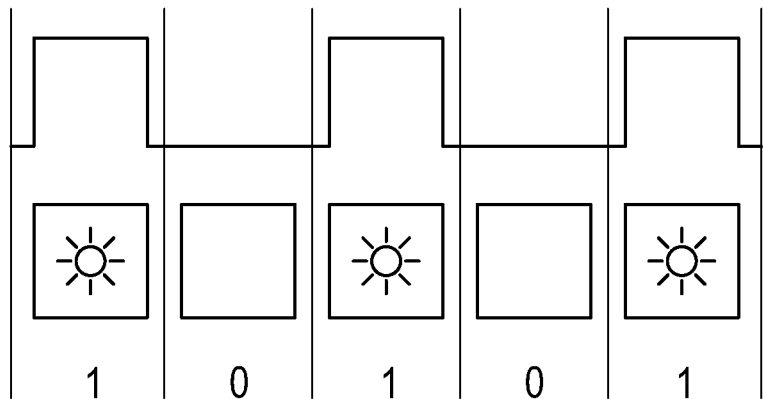
FIGS. 6A to 6C are illustrative diagrams representing the timing and phase issues between an unsynchronised video capture and binary data signal source.

In FIG. 6A the binary signal 10 and video frames 20 are approximately in phase and each bit 11 of the signal 20 is mapping onto a single frame 21 of the video stream. As shown by the beacon light 230. This results in a correct reading of the signal when the video is analysed as shown by the resulting binary output 1,0,1,0,1.

Figure 6B:
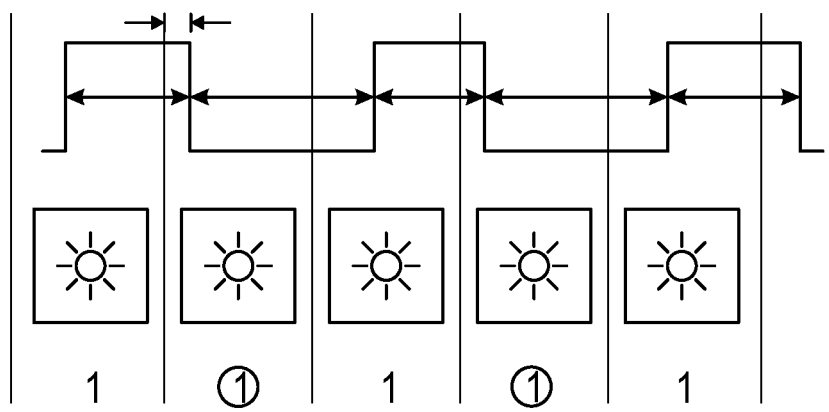

In FIG. 6B the signal 10 and video are out-of-phase (as indicated by the time difference T) such that the switching on/off of the beacon light element 230 changes whilst the shutter of the camera 50 is open. This results in the on/off signal straddling consecutive frames of the video feed. As a result, rather than seeing a clean on/off from the beacon 230 the frames record an "on" signal. Whilst this signal may be of reduced brightness, in a real world/noisy environment it may not be possible to distinguish such a difference. As a result, when the video Is analysed, the resulting binary output returned may (in this example) be 1,1,1,1,1. Thus two additional "1" are returned which should have been registered as "0". Further, when operating continuously, both the duration of each pulse and the frame rate of the video are constant and, therefore, the phase difference T between the signal and frames will remain indefinitely.

The applicant has now recognised that this problem can be overcome without the need to adjust the video frame rate or substantially change the data transmission of the signal. Thus, in some embodiments the system is configured such that the controller of the beacon includes a prescribed amount of jitter into the timing of the signal 10. It will be appreciated that jitter is the deviation of the signal from true periodicity. Whilst all signals may include some element of jitter this would normally be negligible in a controlled on/off switching sequence such as that in systems of the invention. In embodiments of the invention a small, but non-negligible, quantity of jitter is intentionally introduced to the signal. For example, the jitter introduced into the signal may be less than 1% (for example less than 0.5%) of the switching time of the signal. Thus, for a typical camera frame rate of 25 FPS each pulse of the signal may be 40 milliseconds and a jitter of around 100 microseconds could be introduced. Thus, the pulse rate of the signal 10 with the introduced jitter will be 40 milliseconds+/−100 microseconds.

Figure 6C:
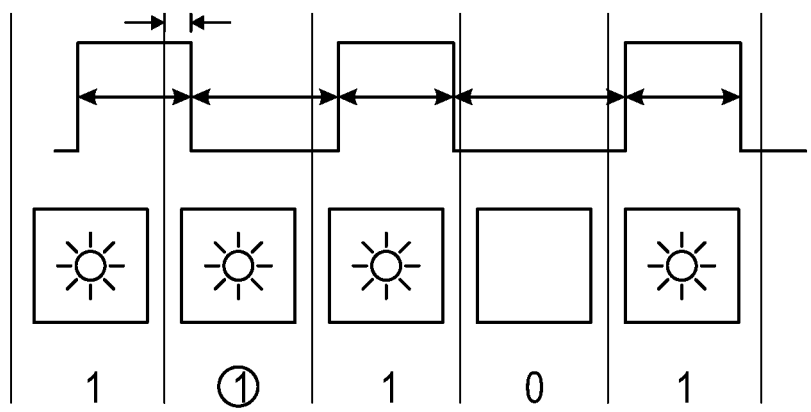

The effect of such jitter is illustrated (with some exaggeration for ease of understanding) in FIG. 6C. In this example the initial out of phase timing T' is the same as that of FIG. 6B. The introduced jitter causes the duration d' of each pulses of the signal 10 to vary slightly in duration (as the signal is deviating from true periodicity). This small difference means that the phase relationship between the video frames 20 and the signal 10 is not fixed but rather shifts in phase over time. As may be noted in the figure, this drifting of phase alignment can ensure that even when a signal is initially out of phase (causing the second frame to be misread as "1" rather than "0") it is able to drift back out of this misalignment to a sufficient extent that subsequent frames are not misread. This same effect can be achieved by adding a non-fixed temporal value to the beacon pulse emission rate, for example a random value between 0 and 100 milliseconds.

Whilst the embodiments above have been described in the context of a general video analysis system having many potential uses, the applicant has now also identified a specific application of the methods and systems described herein, which lies in the area of computer assisted monitoring of exposure to hazardous materials or situations. In particular, such applications may benefit from the distanced, contact free, autonomous working of the methods and systems described herein, to provide such monitoring without encumbrance to the subjects monitored. This may, for example, be particularly useful for medical or care staff working in areas where they risk exposure to infectious diseases (such as Covid-19/SAR-COV-2). Advantageously, a system in accordance with such an embodiment could be implemented using a conventional CCTV camera (or even a camera already in-situ), by providing subjects being monitored with a simple wearable beacon as described, which unobtrusively transmits a signal, substantially invisible to the wearer or the patients that they are providing care to.

Figure 7:
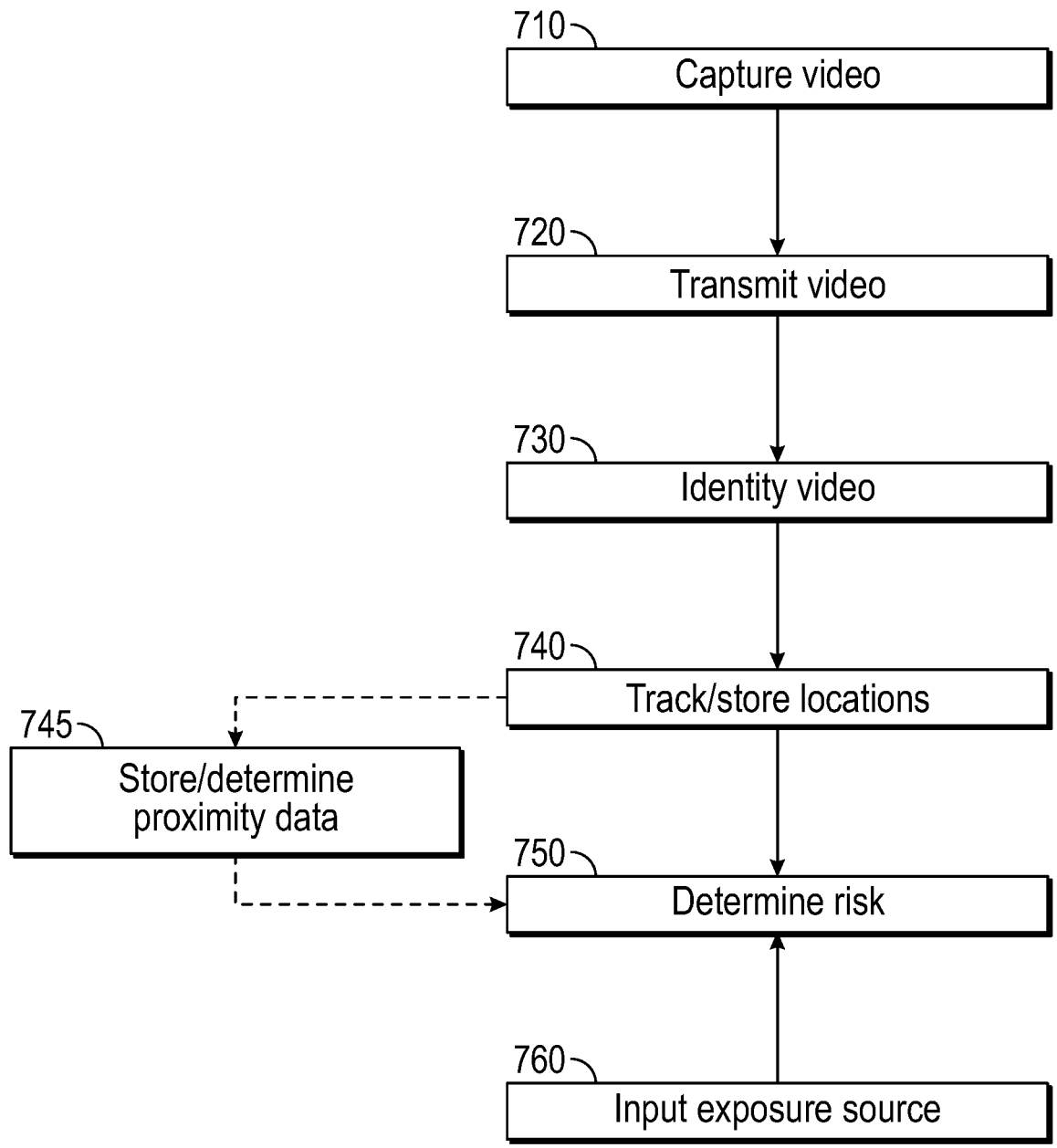
FIG. 7 is a flow chart representing methods and systems in accordance with embodiments for risk monitoring.

In some embodiments, the system or methods described herein may be utilised to provide a risk monitoring system, by tracking the locations of beacons. Such a system and method is illustrated by the flow chart presented in FIG. 7. In a similar manner to other embodiments described herein, a data stream of video is first captured in step 710. The video data is then transmitted to a video analysis system in step 720 and in step 730 the identity of beacons present within the monitored area are identified (using any of the methods described above). The video analytics system may then track and store the locations of each beacon in step 740. Typically, a location history for each beacon may be built up over a period of time. Optionally, the analytics system may also, in step 745, determine and store proximity data for each identified beacon. The proximity data may be based upon the proximity of the beacon to specific points within the monitoring field and/or to any other beacons that are detected Based upon the monitored information, the system and method of this embodiment may determine an exposure risk for each beacon and by extension, the bearer of that beacon, as shown in step 750. For example, the exposure risk may be a function of the distance between the beacon and a potential risk and/or the duration that the beacon was within a specified proximity to that risk. It will be appreciated that the exact formula or parameters used to quantify the exposure risk will be dependent upon the specific application of the system. However, the 2020 COVID pandemic has provided the scientific community with motivation to provide comprehensive theoretical models that describe the relationships between the factors described above (for example M. Kriegel et al 2020). The system described herein has the unique property of capturing the experimental, "real world", data that these theoretical models describe and thus can provide an observed dataset to test these models against. The utility of being able to test the accuracy of the theoretical model is extremely useful in understanding the mechanics of infection and to therefore propose methods of infection control.

Typically, the exposure source used in the method or system of this embodiment may either be designated by its own beacon or may be defined as a fixed point/area in, or defined relative to, the monitoring area. In some embodiments it step 760 of inputting or defining an exposure source may be possible at any stage. For example, the input of a new or updated source in step 760 may result in an updated risk exposure being determined in step 750. This could for example be useful in cases of infectious diseases where it may become apparent retrospectively that one of the subjects has been infected (and therefore the input at 760 could be an action to designate the relevant beacon ID as an exposure source).

Although embodiments of the invention have been described above with reference to preferred embodiments, it will be appreciated that various changes or modification may be made without departing from the scope of the invention as defined in the appended claims.

For example, in some embodiments a beacon or beacons used on a subject may be used for additional image processing uses. For example if a beacon or beacons are provided which are a fixed or known distance apart on a subject it would be possible to measure this distance and thus generate the depth location (Z plane location) of the beacons when processing the 2D frames of captured video.

Further, in order to decrease the computational requirements for processing signals in real-world environments it may be desirable to take steps to clean up the video feed either at the camera or as it is provided to the video analysis system. Accordingly, in some embodiments, the camera(s) used for video capture may be effectively modified to operate as sensors for the beacons, by reducing the volume of light that arrives at the sensor. For example, when the beacons use Infrared LEDs as their light source, the volume of light that these sources produce is so substantial that this will invariably be regarded by the light sensor in the camera as a very high luminance value (for example 255 in an 8-byte greyscale image). Thus, in some embodiments the incoming light could be filtered by a device such as darkened glass, to reduce the overall quantity of light being captured by the sensor on the camera, without changing the value of the pixels relating to the beacon LEDs which are still saturating the sensor capacity to register light at those pixels. Thus, adding darker filters can suppress the albedo light reflected from the materials of the background environment, whist the saturated pixels from the point source IR LED remain brilliant white. In this way, it is possible to run a threshold filter across the frame to isolate only those pixels above a threshold luminary value and thus isolate only the IR pulsing LED's, thus deriving the signal in an extremely computational efficient method, in which the signal is very clean and unpolluted by background noise.

In such an implementation the cameras could be installed in paired arrangements to capture parallel video streams. One of each paired cameras would act as a sensor providing clean, error free, machine-readable data and the second camera would act as image capture device to provide human readable data (normal CCTV output) and for both data from both cameras to be stored for analysis and recall side by side.

In further embodiments of the system the same effect of reducing the volume of light entering the camera can be achieved by increasing the shutter speed of the camera whilst dampening the gain electronically applied by the camera to the captured frame. Since the point LEDs are producing more light than the surrounding albedo reflected light from the background environment, the LED's will saturate the sensor to produce a white pixel at its location, whilst the rest of the reflected light produced by the environment will be abrogated and will produce less luminance as less light is reflected in the same time window. This arrangement has the additional advantage of being electronically controlled and does not require additional devices to add to the CCTV camera. Further, this method also reduces the window in time in which the image is captured and thus reduces the probability that a bit in the data packet 20 may be misaligned due to it being on a border between two captured frames as described above.

It may be appreciated that surveillance systems and methods in accordance with embodiments may have a wide range of applications, for example any application where a contact free, unobtrusive, and generally continuous monitoring is useful. Embodiments could be used is security or safety monitoring. Embodiments could be used to monitor automated equipment such as automated warehouse or handling equipment (which would travel around a surveillance field during operation).

Embodiments could be used for behavioural analytics, for example in crowd control or crowd management including in emergency situations. For example, beacons could be provided to members of a crowd to allow general analysis of crowd behaviour. This could, for example, be on a sample basis (where only selected members of a crowd receive beacons) or a general basis (for example where beacons are incorporated into an identification badge, ticket or pass carried by the majority of customers). Additionally or alternatively, embodiments could be used in emergency, or potential emergency, situations to assist in crowd control and/or safety. This may, for example, be particularly useful in a situations where a crowd is difficult to control or panic behaviour has been triggered (or is at risk of occurring). For example, beacons in accordance with embodiments could be distributed as part of an emergency response or action plan—for example by being included in a survival/emergency response package or aid (for example a beacon could be connected to or incorporated into a life jacket).

The invention claimed is:

1. A video surveillance system comprising:
paired cameras to capture parallel video data streams of a surveillance field;
at least one beacon comprising at least one light emitting element and a controller providing an actuation sequence to the light emitting element such that it emits a binary signal comprising sequential on/off flashes; and
a video analytics system comprising a processor configured to receive video data captured by at least one of the paired cameras and analyse the video data for a presence of light emissions from a beacon,
wherein the binary signal consists of a plurality of transmission packets, each repeating an encoded set of data, and each transmission packet comprising at least a first sub-packet comprising a fixed code and a second sub-packet which changes between transmission packets,
wherein the video analytics system processor is configured to identify the actuation sequence corresponding to the first sub-packet to determine a beacon identification and verify an authenticity of the beacon using the second changing sub-packet,
wherein the at least one light emitting element comprises an infrared LED,
wherein one of the paired cameras captures a video data stream with reduced background light detection and another of the paired cameras captures a conventional video stream.

2. The video surveillance system of claim 1, wherein the binary signal includes a divider signal to provide an indicator between the sub-packets.

3. The video surveillance system of claim 1, wherein a wherein the binary signal includes a divider signal to provide an indicator between consecutive packets.

4. The video surveillance system of claim 2, where the divider signal is a unique pattern not included in any other portion of the binary signal.

5. The video surveillance system of claim 1, wherein both the first and second sub-packet are binary sequences encoded using Fibonacci coding.

6. The video surveillance system of claim 1, wherein the second sub-packet is generated using a public-private key.

7. The video surveillance system of claim 1, wherein the plurality of transmission packets have a fixed bit length.

8. The video surveillance system of claim 7, wherein the fixed bit length is selectable during system configuration.

9. The video surveillance system of claim 7, wherein the fixed bit length is selected such that the transmission packet is less than 1 second.

10. The video surveillance system of claim 1, wherein a bit length of the first and second sub-packets is selectable during configuration of the system.

11. The video surveillance system of claim 1, wherein the controller includes jitter in the actuation sequence.

12. The video surveillance system of claim 1, wherein background light detection is reduced by applying a luminary threshold filter.

13. The video surveillance system of claim 1, wherein background light detection is reduced by increasing a shutter speed of the one of the paired cameras.

14. The video surveillance system of claim 1, wherein at least some beacons are a wearable device.

15. A video surveillance system comprising:
- at least one set of paired cameras to observe a surveillance field and provide resulting video data;
- at least one beacon comprising at least one light emitting element and a controller providing an actuation sequence to the light emitting element such that it emits a binary signal comprising sequential on/off flashes; and
- a video analytics system comprising a processor configured to receive video data captured by the at least one set of paired cameras and analyse the video data for a presence of light emissions from a beacon and identify the beacon using the actuation sequence;
- wherein the at least one set of paired cameras is arranged to capture a first video data stream with reduced background light detection and a parallel conventional video stream.

* * * * *